(12) United States Patent
Hughes et al.

(10) Patent No.: US 12,078,854 B2
(45) Date of Patent: Sep. 3, 2024

(54) OPTICAL ASSEMBLY

(71) Applicant: US Conec, Ltd, Hickory, NC (US)

(72) Inventors: Michael E. Hughes, Hickory, NC (US); Darrell R. Childers, Hickory, NC (US)

( * ) Notice: Subject to any disclaimer, the term of this patent is extended or adjusted under 35 U.S.C. 154(b) by 31 days.

(21) Appl. No.: 17/728,694

(22) Filed: Apr. 25, 2022

(65) Prior Publication Data

US 2022/0342162 A1 Oct. 27, 2022

Related U.S. Application Data (60) Provisional application No. 63/178,987, filed on Apr. 23, 2021.

(51) Int. Cl.
| | |
|---|---|
| *H04B 10/00* | (2013.01) |
| *G01M 11/00* | (2006.01) |
| *G02B 6/42* | (2006.01) |
| *H04B 10/25* | (2013.01) |
| *H04B 10/40* | (2013.01) |

(52) U.S. Cl.
CPC .......... *G02B 6/4246* (2013.01); *G01M 11/31* (2013.01); *G02B 6/4286* (2013.01); *H04B 10/25* (2013.01); *H04B 10/40* (2013.01); *G02B 6/4296* (2013.01)

(58) Field of Classification Search
CPC .. G02B 6/4246; G02B 6/4286; G02B 6/4296; G02B 6/3885; G02B 6/4292; G01M 11/31; H04B 10/25; H04B 10/40
See application file for complete search history.

(56) References Cited

U.S. PATENT DOCUMENTS

| | | | | |
|---|---|---|---|---|
| 6,305,848 | B1 * | 10/2001 | Gregory | G02B 6/4292 385/88 |
| 7,329,054 | B1 * | 2/2008 | Epitaux | G02B 6/4249 385/89 |
| 9,341,786 | B1 * | 5/2016 | Gamache | G02B 6/30 |
| 9,380,003 | B2 * | 6/2016 | Tang | H04L 49/30 |
| 9,417,418 | B2 * | 8/2016 | Eberle, Jr. | G02B 6/4471 |
| 9,482,819 | B2 * | 11/2016 | Li | G02B 6/2938 |
| 9,494,744 | B2 * | 11/2016 | de Jong | G02B 6/3885 |
| 9,557,500 | B1 * | 1/2017 | Luo | H04B 10/40 |
| 9,581,776 | B1 * | 2/2017 | Lee | G02B 6/4246 |
| 9,614,620 | B2 * | 4/2017 | Ho | H04B 10/40 |
| 9,753,229 | B2 * | 9/2017 | Murray | G02B 6/3863 |
| 9,846,283 | B2 * | 12/2017 | Pepe | G02B 6/3893 |

(Continued)

FOREIGN PATENT DOCUMENTS

| | | |
|---|---|---|
| CN | 113296201 A | 8/2021 |
| CN | 111897060 B | 5/2022 |
| WO | 2021217050 A1 | 10/2021 |

*Primary Examiner* — Agustin Bello
(74) *Attorney, Agent, or Firm* — Michael L Leetzow PLLC; Shubhrangshu Sengupta (57) ABSTRACT

An optical transceiver assembly includes an optical transmitter, an optical receiver, and a first multi-fiber ferrule exclusively connected to the optical transmitter via a first set of at least two optical fibers operable to transport respective optical signals away from the optical transmitter. The assembly includes a second multi-fiber ferrule exclusively connected to the optical receiver via a second set of at least two optical fibers operable to transport respective optical signals to the optical transmitter. The first set of at least two optical fibers is separate from the second set of at least two optical fibers.

15 Claims, 6 Drawing Sheets

(56) References Cited

U.S. PATENT DOCUMENTS

| | | | |
|---|---|---|---|
| 9,967,048 B1 | 5/2018 | Salsi | |
| 9,983,374 B2* | 5/2018 | Li | G02B 6/4446 |
| 10,185,100 B2* | 1/2019 | Takano | G02B 6/403 |
| 10,274,687 B1* | 4/2019 | Shi | G02B 6/4292 |
| 10,281,669 B2* | 5/2019 | Takano | G02B 6/4292 |
| 10,466,432 B2* | 11/2019 | Luo | G02B 6/43 |
| 10,598,864 B2 | 3/2020 | Royer et al. | |
| 10,641,968 B2* | 5/2020 | Takano | G02B 6/403 |
| 10,754,108 B2* | 8/2020 | Matsuoka | G02B 6/4244 |
| 10,877,232 B1* | 12/2020 | Bailey | G02B 6/4284 |
| 10,914,903 B2* | 2/2021 | Li | G02B 6/425 |
| 11,199,671 B2* | 12/2021 | Leigh | G02B 6/4246 |
| 11,378,752 B2* | 7/2022 | Son | G02B 6/32 |
| 11,378,764 B2* | 7/2022 | Zhou | G02B 6/4292 |
| 11,385,418 B2* | 7/2022 | Leigh | G02B 6/406 |
| 11,385,426 B2* | 7/2022 | Bechtolsheim | G02B 6/4284 |
| 11,415,763 B2* | 8/2022 | Leigh | G02B 6/4261 |
| 11,454,771 B2* | 9/2022 | Mizuno | G02B 6/4277 |
| 11,474,314 B2* | 10/2022 | Chang | G02B 6/4292 |
| 11,500,153 B2* | 11/2022 | Meade | G02B 6/421 |
| 11,585,994 B2* | 2/2023 | Islam | G02B 6/4279 |
| 11,609,396 B2* | 3/2023 | Cooke | G02B 6/4452 |
| 11,686,912 B1* | 6/2023 | Woodward | G02B 6/4455 385/135 |
| 11,698,497 B2* | 7/2023 | Cheng | G02B 6/4209 385/15 |
| 2007/0258683 A1* | 11/2007 | Rolston | G02B 6/4292 385/88 |
| 2008/0062980 A1* | 3/2008 | Sunaga | H04L 49/351 370/389 |
| 2008/0205823 A1 | 8/2008 | Luther et al. | |
| 2010/0322562 A1* | 12/2010 | Barnes | G02B 6/3885 385/59 |
| 2011/0229086 A1* | 9/2011 | Bradley | G02B 6/3871 385/129 |
| 2012/0219255 A1* | 8/2012 | Bradley | G02B 6/3861 385/129 |
| 2012/0237171 A1* | 9/2012 | Oki | G02B 6/428 385/92 |
| 2012/0237223 A1* | 9/2012 | Matsui | G02B 6/4243 398/139 |
| 2012/0301073 A1* | 11/2012 | DeMeritt | G02B 6/4204 385/59 |
| 2013/0287404 A1* | 10/2013 | McColloch | G02B 6/4246 439/78 |
| 2014/0044395 A1* | 2/2014 | Waldron | G02B 6/3878 385/60 |
| 2014/0248057 A1* | 9/2014 | Li | G02B 6/4452 398/79 |
| 2014/0348468 A1* | 11/2014 | Lagziel | G02B 6/4284 29/825 |
| 2015/0256259 A1* | 9/2015 | Huang | G01J 1/0425 398/139 |
| 2015/0316732 A1* | 11/2015 | Schamuhn | H04B 10/40 398/139 |
| 2016/0004018 A1* | 1/2016 | Lu | G02B 6/3885 385/78 |
| 2016/0149662 A1* | 5/2016 | Soldano | G02B 6/4215 385/14 |
| 2017/0168252 A1* | 6/2017 | Pezeshki | H04B 10/40 |
| 2017/0187462 A1* | 6/2017 | Luo | G02B 6/4246 |
| 2017/0248763 A1* | 8/2017 | Kawamura | G02B 6/425 |
| 2017/0269316 A1* | 9/2017 | Chang | H01L 24/81 |
| 2017/0357064 A1* | 12/2017 | Nagarajan | G02B 6/4215 |
| 2018/0113262 A1* | 4/2018 | Aoki | G02B 6/4441 |
| 2018/0156988 A1* | 6/2018 | Gniadek | H01R 13/6271 |
| 2018/0196196 A1* | 7/2018 | Byrd | G02B 6/14 |
| 2018/0231726 A1* | 8/2018 | Mizuno | G02B 6/4246 |
| 2019/0018206 A1* | 1/2019 | Luo | G02B 6/43 |
| 2019/0033542 A1* | 1/2019 | Epitaux | G02B 6/4226 |
| 2020/0183104 A1* | 6/2020 | Truong | G02B 6/4284 |
| 2020/0192035 A1* | 6/2020 | Leigh | G02B 6/4415 |
| 2020/0192040 A1* | 6/2020 | Li | G02B 6/4403 |
| 2020/0195350 A1* | 6/2020 | Matsui | G02B 6/4281 |
| 2020/0341219 A1* | 10/2020 | Zhou | G02B 6/426 |
| 2021/0239922 A1* | 8/2021 | Du | G02B 6/4266 |
| 2021/0239924 A1* | 8/2021 | Mizuno | G02B 6/4221 |
| 2021/0263247 A1* | 8/2021 | Bechtolsheim | G02B 6/4284 |
| 2022/0066107 A1* | 3/2022 | Leigh | G02B 6/3825 |
| 2022/0244471 A1* | 8/2022 | Khazen | G02B 6/406 |
| 2022/0260791 A1* | 8/2022 | Ninomiya | G02B 6/3897 |
| 2022/0342162 A1* | 10/2022 | Hughes | G02B 6/4286 |
| 2023/0099201 A1* | 3/2023 | Takano | G02B 6/403 385/89 |
| 2023/0145265 A1* | 5/2023 | Wong | G02B 6/403 385/87 |
| 2023/0305253 A1* | 9/2023 | Faulkner | G02B 6/4452 385/135 |

* cited by examiner

OPTICAL ASSEMBLY

REFERENCE TO RELATED CASE

This application claims priority under 35 U.S.C. § 119 (e) to U.S. provisional application No. 63/178,987 filed on Apr. 23, 2021, the contents of which are hereby incorporated by reference in their entirety.

BACKGROUND OF THE INVENTION

With the push to increase the bandwidth of optical systems, one of the places that may be used for the increase is the space in the transceivers. One way to increase the bandwidth in the transceivers is to add additional transmitters and receivers. However, that would also require routing additional optical fibers within the transceiver, but there is limited space on the boards. The optical fibers that are connected within the transceivers—between the edge-mounted fiber optic connector and the transmitters and receivers—are usually very short (~2 in. or less). This makes it difficult to secure both ends of the optical fibers reliably between the edge of the circuit board or the substrate (where there may be a connecting ferrule for the outside world) and the transmitter and receiver location on the board. If the connections are not good and have a high loss, the entire sub-assembly of the fiber optic must be abandoned and a new one produced. This is costly in both dollars and time, particularly when the optical fiber count is high. The manufacturing yield for sub-assemblies of the edge-mounted fiber optic connector and the transmitters and receivers is particularly low when more than 5 optical fibers are routed from the fiber optic connector. For example, for connecting each fiber in a pair of fibers for the transceiver (one fiber for transmitter and one for the detector), the yield is about 90% Thus, there is only a 10% probability that the first fiber connection will be a failure. The second fiber connection success is then a conditional probability of the first fiber's success, that is, 90% of 90%, or 81% chance of success. With each additional fiber that is added subsequently (in case of more than two fibers), the yield or success rate keeps falling due to this conditional probability. Thus, a third fiber will only have a 72% chance of a successful connection to the transceiver, and so on. This problem is exacerbated when the same ferrule at the edge of the connector has connections to both a transmitter in one location of the board, and a receiver at another location on the board (likely from a different transceiver unit than the transmitter on the same circuit board).

Thus, there is a need for an easier way to connect to the transceivers such that the optical fibers and their routing can be handled outside of the transceiver rather than inside it in an effort to increase the success rate or yield. The present invention uses ganged fiber optic connectors to attach optical fibers to the transceiver in an easier way that is transparent to the user and makes the connections seamless, while at the same time reduces the scrap rate of manufacturing such an optical assembly.

SUMMARY OF THE INVENTION

According to one aspect, the present invention is directed to an optical transceiver assembly that includes an optical transmitter, an optical receiver, and a first multi-fiber ferrule exclusively connected to the optical transmitter via a first set of at least two optical fibers operable to transport respective optical signals away from the optical transmitter, and a second multi-fiber ferrule exclusively connected to the optical receiver via a second set of at least two optical fibers operable to transport respective optical signals to the optical transmitter, wherein the first set of at least two optical fibers is separate from the second set of at least two optical fibers.

In some embodiments, there is also a third multi-fiber ferrule ganged with a fourth multi-fiber ferrule, the ganged third multi-fiber ferrule and fourth multi-fiber ferrule being configured to respectively engage the first multi-fiber ferrule and the second multi-fiber ferrule simultaneously.

In some embodiments, the ganged third multi-fiber ferrule and fourth multi-fiber ferrule are optically connected to a fifth multi-fiber ferrule by a third set of optical fibers, the third set of optical fibers comprising twice as many optical fiber as in the first set of at least two optical fibers and/or the second set of at least two optical fibers.

According to another aspect, the present invention is directed to an optical communication assembly that includes a transceiver subassembly that further includes an optical transmitter, an optical receiver, a first multi-fiber ferrule exclusively connected to the optical transmitter via a first set of at least two optical fibers operable to transport respective optical signals from the optical transmitter, and a second multi-fiber ferrule exclusively connected to the optical receiver via a second set of at least two optical fibers operable to transport respective optical signals to the optical transmitter, and a ganged fiber-optic connector removably interfaced with the transceiver subassembly and further includes a third multi-fiber ferrule optically aligned with the first multi-fiber ferrule to further transport the respective optical signals to outside the transceiver subassembly and a fourth multi-fiber ferrule optically aligned with the second multi-fiber ferrule to provide the respective optical signals from outside the transceiver subassembly, wherein the third multi-fiber ferrule and the fourth multi-fiber ferrule are removable or attachable to the transceiver subassembly simultaneously in a ganged arrangement.

In some embodiments, the third multi-fiber ferrule and fourth multi-fiber ferrule are optically connected to a fifth multi-fiber ferrule by a third set of optical fibers In some embodiments, the third set of optical fibers comprise twice as many optical fiber as in the first set of at least two optical fibers and/or the second set of at least two optical fibers.

In yet another aspect, there is an optical connection assembly that includes a multi-fiber connector at a first end of the optical connection assembly, at least two multi-fiber ferrules in a ganged arrangement at a second end of the optical connection assembly and operable to be simultaneously attached to or removed from a transceiver assembly, each of the at least two multi-fiber ferrule having optical fibers holding at least two optical fibers, and at least one cable coupled to the multi-fiber connector and the ganged arrangement of the at least two multi-fiber ferrules between the first end and the second end of the optical connection assembly In some embodiments, a first of the at least two multi-fiber ferrules has optical fibers only carrying optical signals to the transceiver assembly and a second of the at least two multi-fiber ferrules has optical fibers only carrying optical signals away from the transceiver assembly.

In some embodiments, there is also a third multi-fiber ferrule and a fourth multi-fiber ferrule fixedly attached to a circuit board common to the transceiver assembly and the at least two additional multi-fiber ferrules, wherein the third multi-fiber ferrule is optically coupled to a transmitter of the transceiver assembly and the fourth multi-fiber ferrule is optically coupled to a receiver of the transceiver assembly, and wherein the first of the at least two multi-fiber ferrules is mated to the third fiber-optic ferrule and the second of the at least two multi-fiber ferrules is mated to the fourth fiber-optic ferrule.

In some embodiments, the at least one cable has optical fibers carrying optical signals to the transceiver assembly and optical fibers carrying optical signals away from the transceiver assembly.

DETAILED DESCRIPTION OF THE INVENTION

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
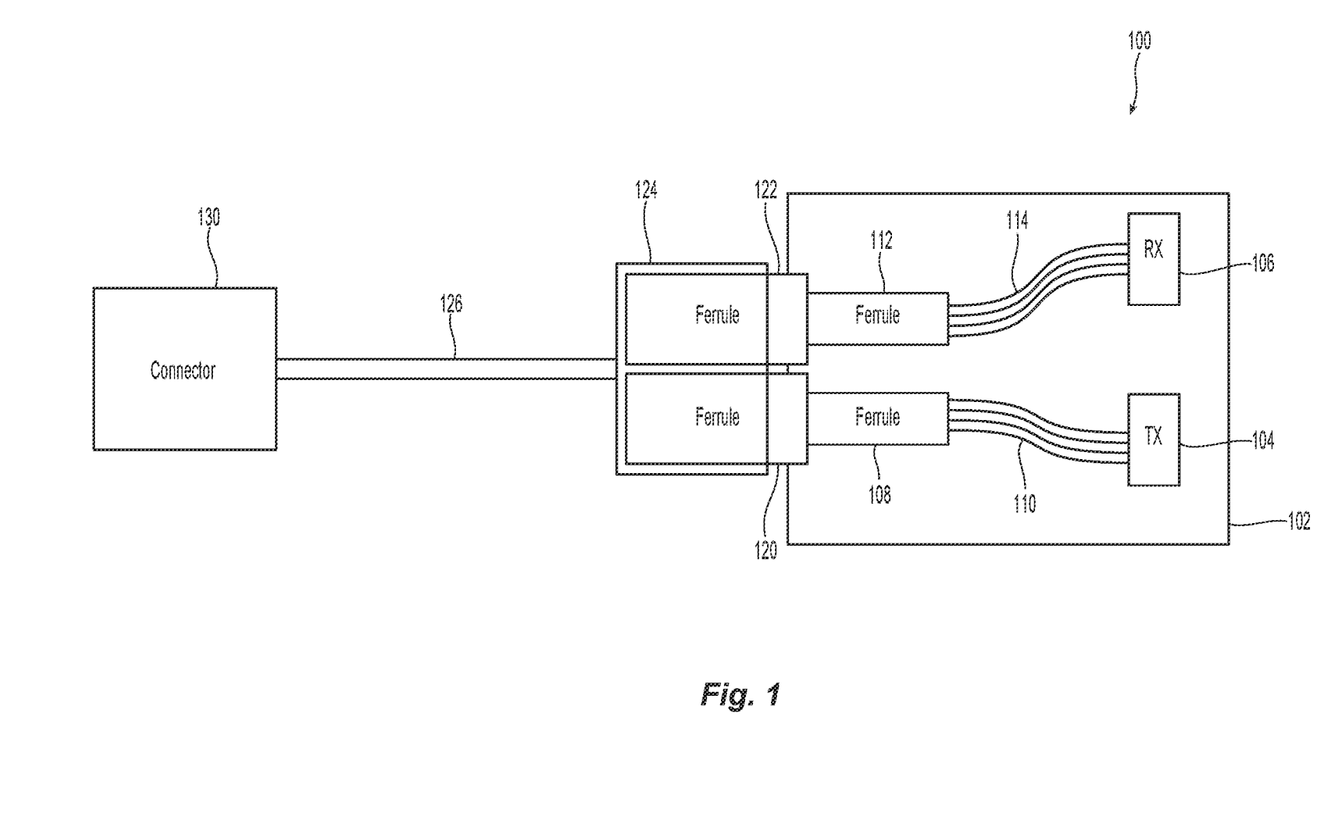
FIG. 1 is a schematic of one embodiment of an optical transceiver assembly according to the present invention.

Illustrated in FIG. 1 is one embodiment of an optical transceiver assembly 100 according to the present invention. The optical transceiver assembly 100 includes a substrate 102. The substrate 102 may be a printed circuit board (e.g., a daughter card of a communication equipment) or a silicon based substrate. The substrate 102 supports, among other components, an optical transmitter 104, an optical receiver 106, and a first multi-fiber ferrule 108 exclusively connected to the optical transmitter 104 via a first set of at least two optical fibers 110 operable to transport respective optical signals away from the optical transmitter 104. The optical transceiver assembly 100 also includes a second multi-fiber ferrule 112 exclusively connected to the optical receiver 106 via a second set of at least two optical fibers 114 operable to transport respective optical signals to the optical receiver 106. However, there may be only one optical fiber 110 that connects to the optical transmitter 104, while another single optical fiber connects to the optical receiver 106. As is clear from FIG. 1, the first set of at least two optical fibers 110 is separate from the second set of at least two optical fibers 114. Thus, each of the fiber optic ferrules 108,112 have optical fibers 110,114 that transmit optical signals in only one direction. The optical transmitter 104, the optical receiver 106, the first multi-fiber ferrule 108, and the second multi-fiber ferrule 112 may collectively be referred to as a transceiver subassembly of the overall transceiver assembly 100.

It should be noted that the fiber optic ferrules 108,112 could be of any type of multi-fiber fiber optic ferrules. In one example, the fiber optic ferrules 108,112 could be the TMT ferrule provided by Applicant and discussed in co-pending application PCT/US2021/028919 (published as WO/2021/21750), the contents of which are incorporated in entirety herein. The fiber optic ferrules 108,112 could also be an MT ferrule used with Applicant's MTP® brand connector or the rounded single fiber ferrules in Applicant's MDC connector.

As depicted in FIG. 1, the optical transmitter 104 and the optical receiver 106 are preferably housed in the same structure, usually a transceiver. Moreover, the example in FIG. 1 has four optical fibers in each of the sets of optical fibers 110,114. There are other numbers of optical fibers 110,114 that could be supported by the optical transceiver assembly 100. See, e.g., FIG. 2, where there are 8 optical fibers in each of the sets of optical fibers.

The optical transceiver assembly 100 may also include a third multi-fiber ferrule 120 engaged with the first multi-fiber ferrule 108 and a fourth multi-fiber ferrule 122 engaged with the second multi-fiber ferrule 112. Preferably the third multi-fiber ferrule 120 and the fourth multi-fiber ferrule 122 are ganged together so that they connect with the fiber optic ferrules 108,112 as one unit. This can be done in a number of ways and with a number of structures 124 (and structure 224 and 324 in FIGS. 2 and 3, respectively) that are familiar to those skilled in the art. See, for example, Applicant's PCT patent application PCT/US2020/066160 (published as WO 2021/127531), the contents of which are incorporated by reference in entirety herein. One of skill in the art would also recognize that there would be an adapter (or other similar device) that allows for the third multi-fiber ferrule 120 to engage the first multi-fiber ferrule 108 and the fourth multi-fiber ferrule 122 to engage the second multi-fiber ferrule 112, although that is not shown in the figures. As with the multi-fiber ferrules discussed above, the third multi-fiber ferrule 120 and the fourth multi-fiber ferrule 122 may be any one of a number of fiber optic ferrules (in a number of fiber optic connectors) as long as the chosen multi-fiber ferrules can respectively mate with the first multi-fiber ferrule 108 and the second multi-fiber ferrule 112 attached to the substrate 102.

The optical transceiver assembly 100 may also include a third set of optical fibers 126 that optically connects the third multi-fiber ferrule 120 and the fourth multi-fiber ferrule 122 with a fifth multi-fiber ferrule 130 (within a connector housing or by itself). The third set of optical fibers 126 (and the fifth multi-fiber ferrule 130) should have twice the number of optical fibers as are secured within the third multi-fiber ferrule 120 and the fourth multi-fiber ferrule 122, since the optical fibers 126 are split between the third multi-fiber ferrule 120 and the fourth multi-fiber ferrule 122. The third set of optical fibers 126 could be in any form—such as loose fibers, a ribbon format, etc. The fifth multi-fiber ferrule 130 will be optically connected to another transceiver using an MTP® brand connector, the MDC connector, or another type of fiber optic connector either in a format similar to the connection to the substrate 102, or via an intermediary adapter and additional mating ferrules to the left of the fifth multi-fiber ferrule 130 in FIG. 1. By having the first fiber optic ferrule 108 connect exclusively to the transmitter 102 and the second fiber optic ferrule 112 connect exclusively to the receiver 106, the manufacturing complexity of the optical transceiver assembly 100 is simplified. This is because, the user terminating the optical fibers 110,114 does not have to crisscross or shuffle the fibers from the same ferrule to both the transmitter 102 and the receiver 106 in the small and tight space on the substrate 102.

Figure 2:
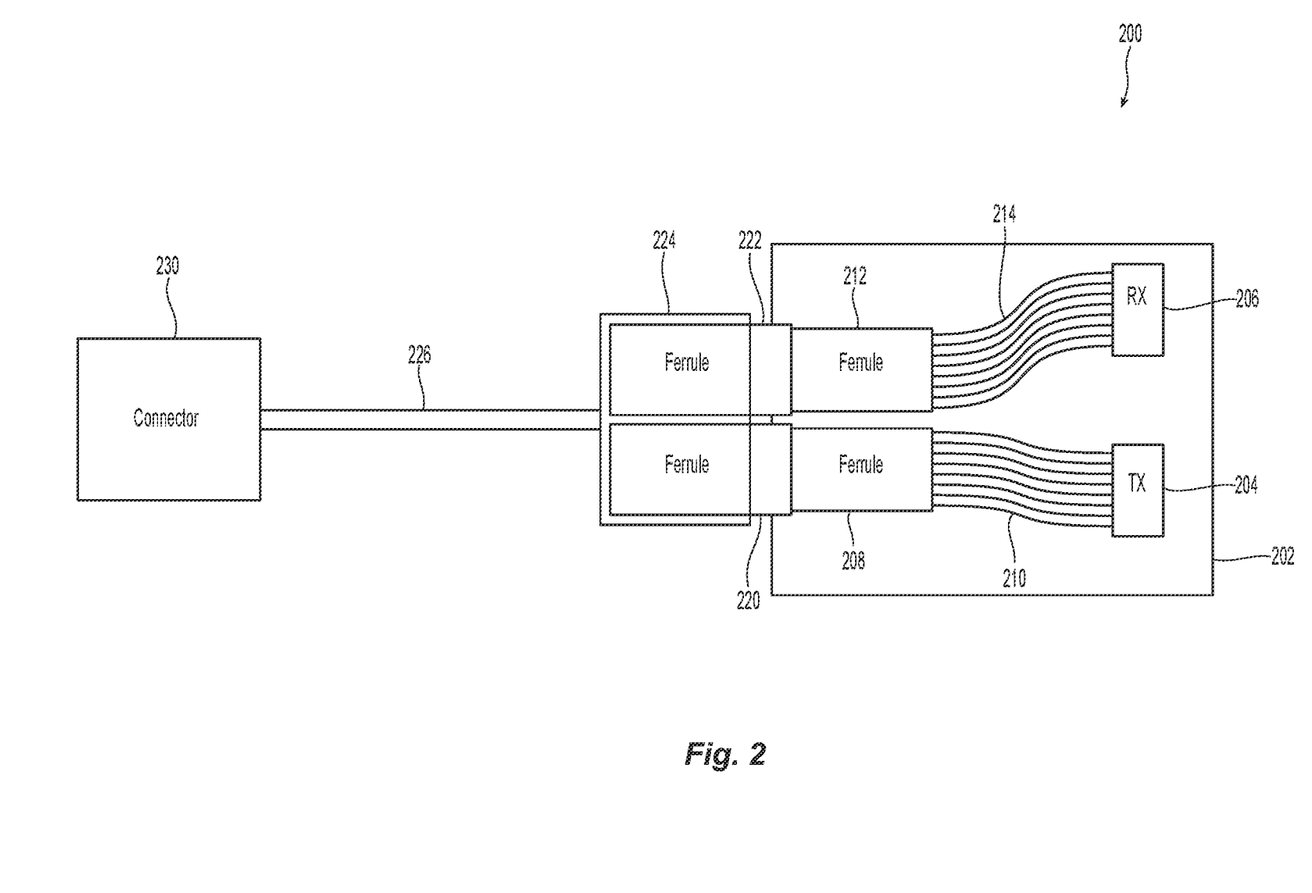
FIG. 2 is a schematic of another embodiment of an optical transceiver assembly according to the present invention.

FIG. 2 illustrates another embodiment of an optical transceiver assembly 200. In this embodiment there are 8 optical fibers that link the first multi-fiber ferrule 208 to the optical transmitter 204 and also link the second multi-fiber ferrule 212 exclusively connected to the optical receiver 206, rather than the four optical fibers in FIG. 1. Since the multi-fiber ferrules 208,212 can accommodate more than the 4 or the 8 optical fibers as noted above, the other elements in this optical transceiver assembly 200 correspond to those noted above. That is, there is a substrate 202 that supports the optical transmitter 204 and the optical receiver 206. There are the third multi-fiber ferrule 220, the fourth multi-fiber ferrule 222, and the fifth multi-fiber ferrule 230. The third set of optical fibers 226 also have twice the number as in the third multi-fiber ferrule 220 and the fourth multi-fiber ferrule 222. The ferrules can hold up to 16 or even 32 optical fibers, but as noted above, it is best that those ferrules on the substrate are not more than the 16. This helps in reducing the probability of faulty connections on the substrate 202 between the optical fibers terminated at the transmitter 204 and the receiver 206, thereby assuring a high yield of manufacturability of the optical transceiver assembly 200.

Figure 3:
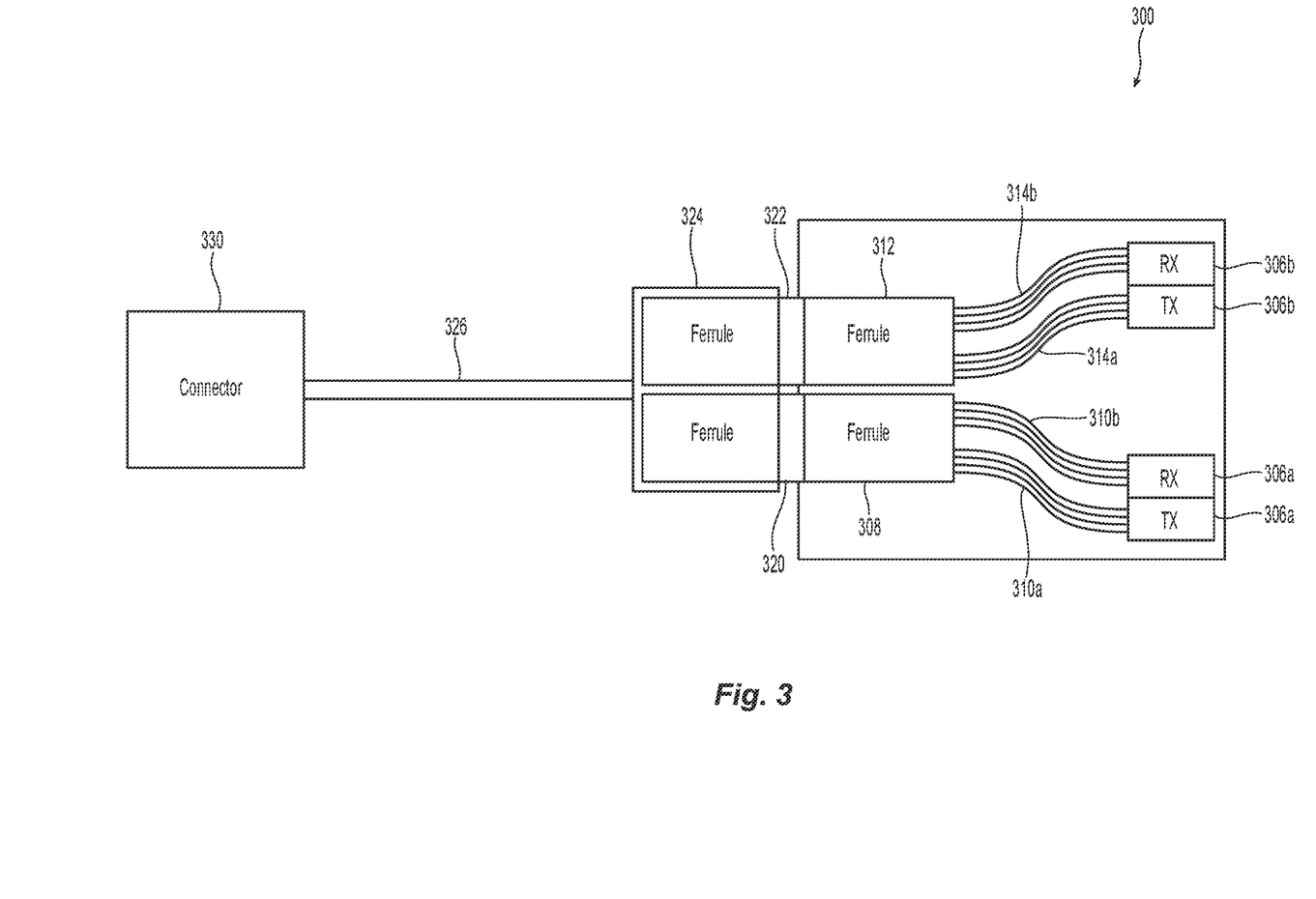
FIG. 3 is a schematic of another embodiment of an optical transceiver assembly according to the present invention.

Another embodiment of an optical transceiver assembly 300 is illustrated in FIG. 3. In this case, there is a first multi-fiber ferrule 308 and a second multi-fiber ferrule 312 attached to the substrate 302. Each of the first multi-fiber ferrule 308 and the second multi-fiber ferrule 312 are attached to an optical transmitter 304a, 304b and an optical receiver 306a,306b, respectively. Thus, rather than the multi-fiber ferrules being attached exclusively to either the transmitter or the receiver, they are attached to both an optical transmitter and an optical receiver. Thus, the first multi-fiber ferrule 308 is optically attached to the optical transmitter 304a and the optical receiver 306a using the optical fibers 310a and 310b, respectively. Similarly, the second multi-fiber ferrule 312 is optically attached to the optical transmitter 304b and the optical receiver 306b using the optical fibers 314a and 314b respectively. The other components of the optical transceiver assembly 300 again are similar to the other components noted above. That is, there are the third multi-fiber ferrule 320, the fourth multi-fiber ferrule 322, and the fifth multi-fiber ferrule 330. The third set of optical fibers 326 also have twice the number as in the third multi-fiber ferrule 320 and the fourth multi-fiber ferrule 322.

Again, knowing that a smaller number of optical fibers are attached to the fiber optic connectors 308,312 at the edge of the board, it is less likely that some of the subassemblies will have to be reworked. As one of skill in the art knows, the re-working of the subassemblies is not permitted, but the faulty ones will have to be removed and replaced by entirely new subassemblies.

It will be appreciated by one of ordinary skill in the art after reading this disclosure, that in each of FIGS. 1, 2, and 3, the respective number of ferrules 112, 108, 212, 208, 312 and 308 may not be limited to two. For example, the substrate 202 may have additional ferrules connected to additional receivers and transmitters. Likewise, the structures 124, 224, and 324 will accordingly then have a higher number of mating connectors to mate with those additional ferrules on the board or the substrate 102.

Figure 4:
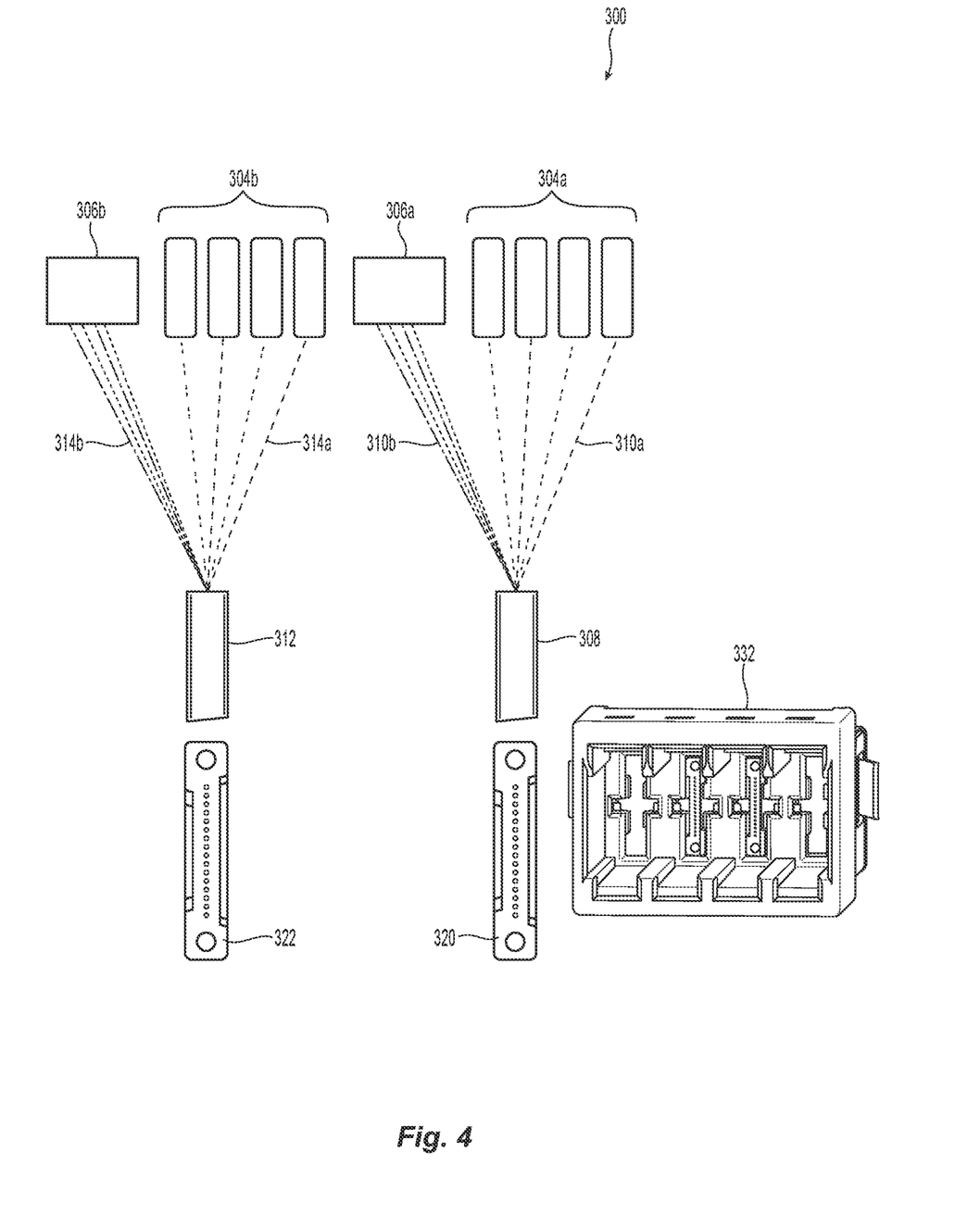
FIG. 4 illustrates a more detailed representation of transceiver illustrated in FIG. 3.

Turning to FIG. 4, there is a more detailed version of one embodiment of the optical transceiver assembly 300. Beginning with the first multi-fiber ferrule 308 and the second multi-fiber ferrule 312, they are illustrated in FIG. 4 as a TMT ferrule. The first multi-fiber ferrule 308 and the second multi-fiber ferrule 312 are optically connected to the optical transmitter 304a and the optical receiver 306a using the optical fibers 310a and 310b. The optical transmitters 304a, 304b are represented by four single fiber ferrules that are connected to a laser (not shown). The optical receivers 306a, 306b are represented by a v-groove array. It is possible that the optical transmitters 304a,304b be represented by a v-groove array while the optical receivers be represented by the single fiber ferrules. Also illustrated in FIG. 4 is one embodiment of a transceiver interface 332 that would be attached to the substrate 302. In this case, the first multi-fiber ferrule 308 and the second multi-fiber ferrule 312 would be inserted from the back of the transceiver interface 332 as illustrated. Then the third multi-fiber ferrule 320 and the fourth multi-fiber ferrule 322 would be inserted into the front of the transceiver interface 332, on the side facing the reader. The third multi-fiber ferrule 320 and the fourth multi-fiber ferrule 322 could also be a part of a fiber-optic connector housing.

Figure 5:
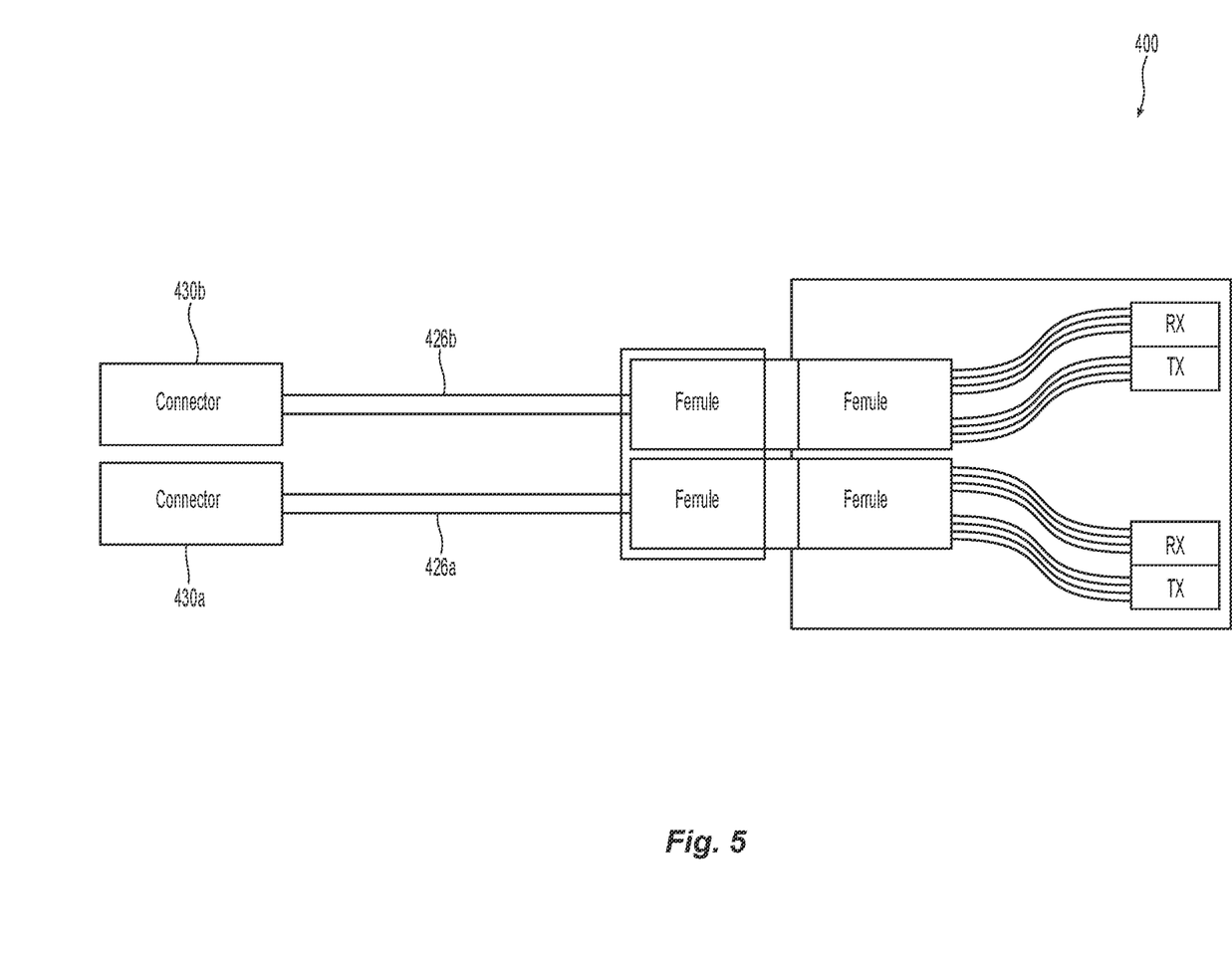
FIG. 5 is a schematic of another embodiment of an optical transceiver assembly according to the present invention.

Illustrated in FIG. 5 is another embodiment of an optical transceiver assembly 400. In this embodiment, the difference between optical transceiver assembly 400 and the prior optical transceiver assembly 300 is that the third set of optical fibers 326 are now divided into two sets of optical fibers 426a and 426b and there are two fiber optic connectors 430a,430b.

Figure 6:
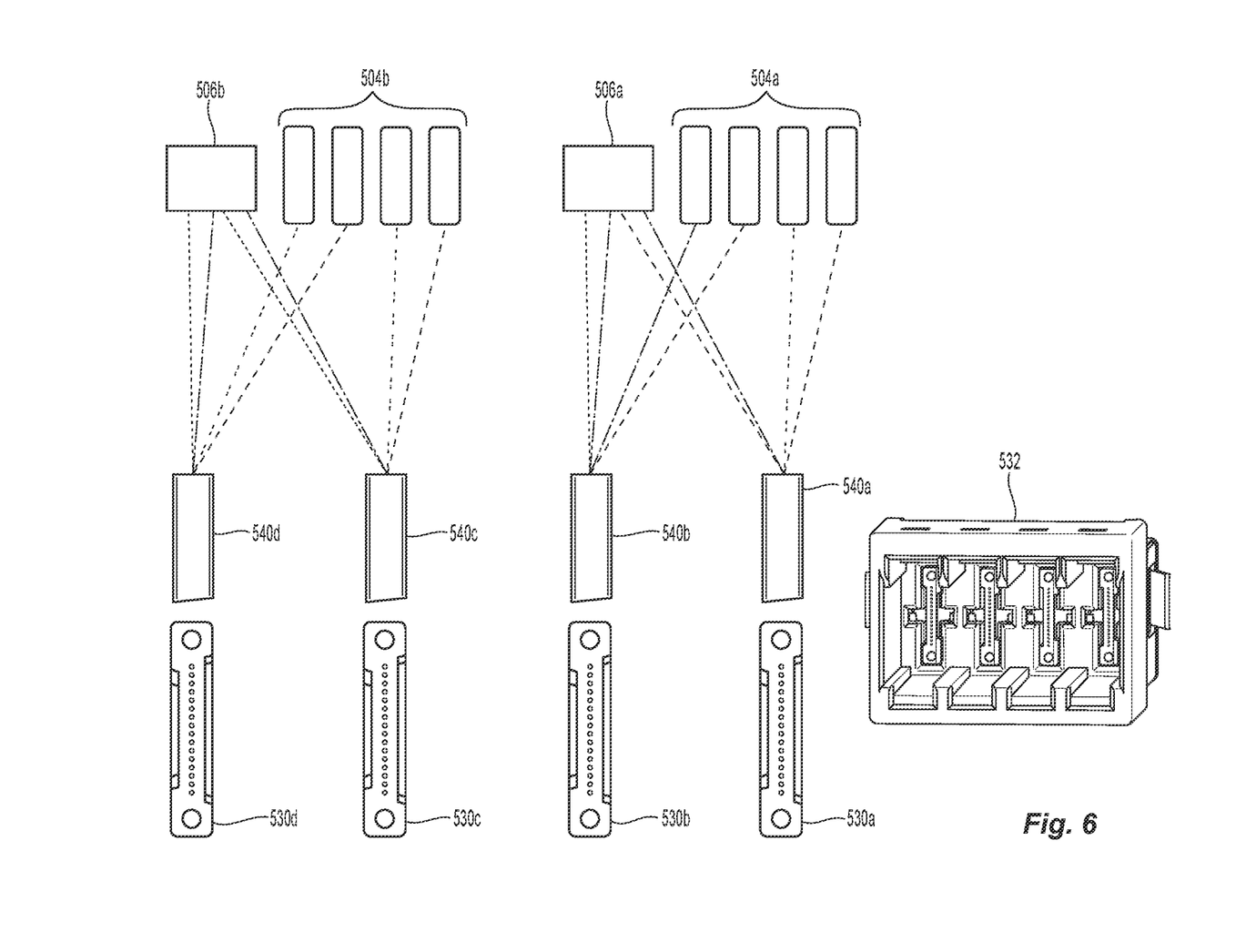
FIG. 6 illustrates a more detailed representation of transceiver according to the present invention.

FIG. 6 illustrates another embodiment of an optical transceiver assembly 500 that reduces the complexity over a 16 fiber or 32 fiber system. Indeed, this assembly 500 essentially splits up the optical fibers that were secured in the first and second multi-fiber ferrules (308,312 in FIG. 4) into four multi-fiber ferrules 540a,540b,540c,540d so that there are now four multi-fiber ferrules in the rear side of the transceiver interface 532. These four multi-fiber ferrules 540a, 540b,540c,540d are mated to the four multi-fiber ferrules 530a,530b,530c,530d, respectively. This shuffling of the optical fibers and the multi-fiber ferrules provides for a cleaner and less congested transceiver and, if there were an issue with the manufacturing, would result in less waste.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An optical transceiver assembly comprising:
    an optical transmitter;
    an optical receiver;
    a first multi-fiber ferrule exclusively connected to the optical transmitter via a first set of at least two optical fibers operable to transport respective optical signals away from the optical transmitter; and
    a second multi-fiber ferrule exclusively connected to the optical receiver via a second set of at least two optical fibers operable to transport respective optical signals to the optical receiver,
    wherein the first set of at least two optical fibers is separate from the second set of at least two optical fibers.

2. The optical transceiver assembly according to claim 1, wherein the optical transmitter and the optical receiver are housed together.

3. The optical transceiver assembly according to claim 1, wherein the optical transmitter and the optical receiver are components of a transceiver.

4. The optical transceiver assembly according to claim 1, wherein the first set of at least two optical fibers comprise at least four optical fibers and the second set of at least two optical fibers comprise at least four optical fibers.

5. The optical transceiver assembly according to claim 1, further comprising a third multi-fiber ferrule ganged with a fourth multi-fiber ferrule, the ganged third multi-fiber ferrule and fourth multi-fiber ferrule being configured to respectively engage the first multi-fiber ferrule and the second multi-fiber ferrule simultaneously.

6. The optical transceiver assembly according to claim 5, wherein the ganged third multi-fiber ferrule and fourth multi-fiber ferrule are optically connected to a fifth multi-fiber ferrule by a third set of optical fibers, the third set of optical fibers comprising twice as many optical fiber as in the first set of at least two optical fibers and/or the second set of at least two optical fibers.

7. An optical communication assembly comprising:
a transceiver subassembly further comprising:
an optical transmitter,
an optical receiver,
a first multi-fiber ferrule exclusively connected to the optical transmitter via a first set of at least two optical fibers operable to transport respective optical signals from the optical transmitter, and
a second multi-fiber ferrule exclusively connected to the optical receiver via a second set of at least two optical fibers operable to transport respective optical signals to the optical transmitter; and
a ganged fiber-optic connector removably interfaced with the transceiver subassembly and further comprising:
a third multi-fiber ferrule optically aligned with the first multi-fiber ferrule to further transport the respective optical signals to outside the transceiver subassembly,
a fourth multi-fiber ferrule optically aligned with the second multi-fiber ferrule to provide the respective optical signals from outside the transceiver subassembly,
wherein the third multi-fiber ferrule and the fourth multi-fiber ferrule are removable or attachable to the transceiver subassembly simultaneously in a ganged arrangement.

8. The optical communication assembly according to claim 7, wherein the third multi-fiber ferrule and fourth multi-fiber ferrule are optically connected to a fifth multi-fiber ferrule by a third set of optical fibers.

9. The optical communication assembly according to claim 8, wherein the third set of optical fibers comprise twice as many optical fiber as in the first set of at least two optical fibers and/or the second set of at least two optical fibers.

10. The optical communication assembly according to claim 8, wherein the optical transmitter and the optical receiver are housed together.

11. An optical connection assembly comprising:
a multi-fiber connector at a first end of the optical connection assembly;
at least two multi-fiber ferrules in a ganged arrangement at a second end of the optical connection assembly and operable to be simultaneously attached to or removed from a transceiver assembly, each of the at least two multi-fiber ferrule having optical fibers holding at least two optical fibers; and
at least one cable coupled to the multi-fiber connector and the ganged arrangement of the at least two multi-fiber ferrules between the first end and the second end of the optical connection assembly.

12. The optical communication assembly according to claim 11, wherein a first of the at least two multi-fiber ferrules has optical fibers only carrying optical signals to the transceiver assembly and a second of the at least two multi-fiber ferrules has optical fibers only carrying optical signals away from the transceiver assembly.

13. The optical communication assembly according to claim 12 further comprising:
a third multi-fiber ferrule and a fourth multi-fiber ferrule fixedly attached to a circuit board common to the transceiver assembly and the at least two additional multi-fiber ferrules, wherein the third multi-fiber ferrule is optically coupled to a transmitter of the transceiver assembly and the fourth multi-fiber ferrule is optically coupled to a receiver of the transceiver assembly, and wherein the first of the at least two multi-fiber ferrules is mated to the third multi-fiber ferrule and the second of the at least two multi-fiber ferrules is mated to the fourth multi-fiber ferrule.

14. The optical communication assembly according to claim 11, wherein the first set of at least two optical fibers comprise at least four optical fibers and the second set of at least two optical fibers comprise at least four optical fibers.

15. The optical communication assembly according to claim 11, wherein the at least one cable has optical fibers carrying optical signals to the transceiver assembly and optical fibers carrying optical signals away from the transceiver assembly.

\* \* \* \* \*